US010025290B2

(12) United States Patent
    Takeno

(10) Patent No.: US 10,025,290 B2
(45) Date of Patent: Jul. 17, 2018

(54) THERMAL DISPLACEMENT CORRECTION TRAINING UNIT FOR MACHINE TOOL

(71) Applicant: FANUC Corporation, Yamanashi (JP)

(72) Inventor: Shouhei Takeno, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 261 days.

(21) Appl. No.: 15/150,435

(22) Filed: May 10, 2016

(65) Prior Publication Data
    US 2016/0334779 A1  Nov. 17, 2016

(30) Foreign Application Priority Data
    May 11, 2015  (JP) ................. 2015-096360

(51) Int. Cl.
    *G05B 19/404*  (2006.01)

(52) U.S. Cl.
    CPC .. *G05B 19/404* (2013.01); *G05B 2219/49219* (2013.01)

(58) Field of Classification Search
    CPC ................ G05B 19/404; G05B 2219/49219
    See application file for complete search history.

(56) References Cited

U.S. PATENT DOCUMENTS 4,590,580 A * 5/1986 Takezawa ............ G05B 19/404
                                              318/572
    5,619,414 A * 4/1997 Ishii ...................... G05B 19/404
                                              318/565

5,895,181 A * 4/1999 Ito ....................... B23Q 11/0003
                                              409/132
    (Continued)

FOREIGN PATENT DOCUMENTS

JP     2002-239872 A     8/2002
    JP     2003-316405 A    11/2003
                      (Continued)

OTHER PUBLICATIONS

Evaluation Method of Thermal Displacement of Machine Tools; Shimizu et al., printed from Internet on Mar. 19, 2018; 5 pages.*
    (Continued)

*Primary Examiner* — Ronald D Hartman, Jr.
(74) *Attorney, Agent, or Firm* — Hauptman Ham, LLP

(57) ABSTRACT

A thermal displacement correction training unit has a virtual machine tool, a virtual machine tool control unit and a virtual machine tool display unit. The virtual machine tool has a precision decline imitating unit for imitating the process precision decline caused by the heat during operation in the virtual machine tool unit, and a precision decline calculation unit for finding the amount of precision decline that represents the process precision decline in the process machine unit imitated by the process precision imitating unit. The virtual machine tool control unit has a precision correction unit for finding the correction amount by which the processing point is corrected in response to thermal displacement, and a correction amount adjustment unit for adjusting the correction amount found by the precision correction unit. The virtual machine tool display unit displays the amount of precision decline and the correction amount.

4 Claims, 3 Drawing Sheets

(56) References Cited

U.S. PATENT DOCUMENTS

| | | | |
|---|---|---|---|
| 6,019,506 A * | 2/2000 | Senda | B23Q 11/0003 |
| | | | 374/55 |
| 6,456,896 B1 * | 9/2002 | Ito | G05B 19/404 |
| | | | 700/174 |
| 2004/0066831 A1 | 4/2004 | Shivaswamy et al. | |
| 2007/0061037 A1 | 3/2007 | Grossmann et al. | |
| 2007/0105697 A1 * | 5/2007 | Iefuji | B23Q 3/155 |
| | | | 483/1 |
| 2007/0248937 A1 | 10/2007 | Chen | |
| 2013/0190921 A1 * | 7/2013 | Maekawa | B23Q 11/0007 |
| | | | 700/177 |
| 2013/0223946 A1 * | 8/2013 | Yamamoto | G05B 19/404 |
| | | | 409/80 |
| 2014/0074299 A1 * | 3/2014 | Endou | G05B 13/02 |
| | | | 700/275 |
| 2017/0185063 A1 * | 6/2017 | Suzuki | G05B 19/19 |

FOREIGN PATENT DOCUMENTS

| | | |
|---|---|---|
| JP | 2007-293812 A | 11/2007 |
| JP | 2009-80517 A | 4/2009 |
| JP | 2013-146823 A | 8/2013 |
| JP | 2014-54700 A | 3/2014 |

OTHER PUBLICATIONS

Compensation of Machine Tool Thermal Errors Based on Transfer Functions; Horejs et al., printed from Internet on Mar. 19, 2018; 4 pages.*
Office Action in JP Application No. 2015-096360, dated May 30, 2017.

* cited by examiner

THERMAL DISPLACEMENT CORRECTION TRAINING UNIT FOR MACHINE TOOL

RELATED APPLICATIONS

The present application claims priority to Japanese Patent Application Number 2015-096360, filed May 11, 2015, the disclosure of which is hereby incorporated by reference herein in its entirety.

BACKGROUND OF THE INVENTION

1. Field of the Invention

The present invention relates to a thermal displacement correction training unit for simulating on a computer a precision correction method and an adjustment method for a machine tool.

2. Description of the Related Art

When a work is processed using a machine tool, a microscopic displacement (hereinafter referred to as thermal displacement) is generated in the structure of the machine tool due to heat generated from the motor and the ball screws that form the machine tool and the processed portion of the work, cooling by the cooling oil or the cooling air, and disturbance by the outside air temperature. As a result, the point at which the work is processed slips, which becomes one of the major factors that affect the process precision. As a countermeasure for such thermal displacement, there is a method for correcting the slippage of the processing point by predicting the amount of heat generated at the time of processing and the amount of change in the structure (hereinafter referred to as thermal displacement correction).

As described above, thermal displacement varies upon the reception of the effects by the outside air temperature and the cooling oil, and therefore, even the same machine has a different amount of thermal displacement depending on the situation. In the case where the precision in the processing of the work at the time of thermal displacement correction is not sufficient after actual measurement of the dimensions of the work that has been processed, an operation may be carried out for closing the gap between the amount of thermal displacement and the amount of thermal displacement correction by changing the amount of thermal displacement correction depending on the situation (hereinafter referred to as adjustment of thermal displacement correction). As for such an adjustment of thermal displacement correction, Japanese Unexamined Patent Publication 2014-54700 discloses a method for allowing an operator to move an image of the work or an image of the tool within the screen for visual adjustment.

However, the following problems can be cited as problems to be solved in the prior art.

The amount of thermal displacement and the amount of correction thereof are generally minute, which means the amount of adjustment for correction is also minute, and thus, it is difficult to visually determine whether or not the adjustment of the correction amount is precise. The technology in Japanese Unexamined Patent Publication 2014-54700 does not disclose a method for determining whether or not the adjustment of thermal displacement correction is appropriate. It is necessary to sufficiently train the operators who operate a machine tool for the operation of adjusting the thermal displacement correction so that the adjustment of thermal displacement correction can be appropriately carried out.

It is also necessary to prepare actual machine tools in order to train the operators so that the operators can learn a method for using thermal displacement correction. However, machine tools are generally expensive, which makes it economically difficult to prepare machine tools for the purpose of training for thermal displacement correction. There is also a risk of affecting other parts of the process in temporarily stopping for training the processing of a work with an actual machine tool that is being used for the processing of a work.

As a result, it is not practical for an operator to have an opportunity to be trained for thermal displacement correction using an actual machine tool.

SUMMARY OF THE INVENTION

An object of the present invention is to provide a thermal displacement correction training unit for allowing an operator to be trained for the thermal displacement correction method and the adjustment method for thermal displacement correction of a machine tool without using an actual machine tool.

The thermal displacement correction training unit according to the present invention is a thermal displacement correction training unit having on a computer a virtual machine tool unit, a virtual machine tool control unit for virtually controlling the above-described virtual machine tool unit, a virtual machine tool operating unit for operating the above-described virtual machine tool unit and the above-described virtual machine tool control unit, and a virtual machine tool display unit, and is characterized in that the above-described virtual machine tool unit has: a precision decline imitating unit for imitating the process precision decline caused by the heat during operation of the above-described virtual machine tool unit; and a precision decline calculating unit for finding the amount of precision decline that represents the process precision decline in the above-described virtual machine tool unit that is imitated in the above-described precision decline imitating unit, the above-described virtual machine tool control unit has: a precision correction unit for finding the correction amount by which the processing point is corrected in response to thermal displacement; and a correction amount adjustment unit for adjusting the correction amount that is found by the above-described precision correction unit, and the above-described virtual machine tool display unit displays the amount of precision decline found by the above-described precision decline calculating unit in the above-described virtual machine tool unit and the correction amount adjusted by the above-described correction amount adjustment unit in the above-described virtual machine tool control unit.

The above-described virtual machine tool display unit displays at least either the change in the processing point in the above-described virtual machine tool unit found in the above-described precision decline imitating unit or the change in the processing point found in the above-described precision correction unit.

At least either the amount of precision decline found by the above-described precision decline calculation unit or the precision correction amount for the above-described precision correction unit may have been set in advance.

The above-described virtual machine tool display unit may display the above-described virtual machine tool unit.

The present invention can provide a thermal displacement correction training unit for allowing an operator to be trained in order to learn the thermal displacement correction method and the adjustment method for thermal displacement correction of a machine tool without using an actual machine tool.

BRIEF DESCRIPTION OF THE DRAWINGS

The above-described and other objects and features of the present invention will be clarified from the following descriptions of the embodiments in reference to the accompanying drawings from among which.

DETAILED DESCRIPTION OF THE PREFERRED EMBODIMENTS

An embodiment of the present invention is described below in reference to the drawings.

Figure 1:
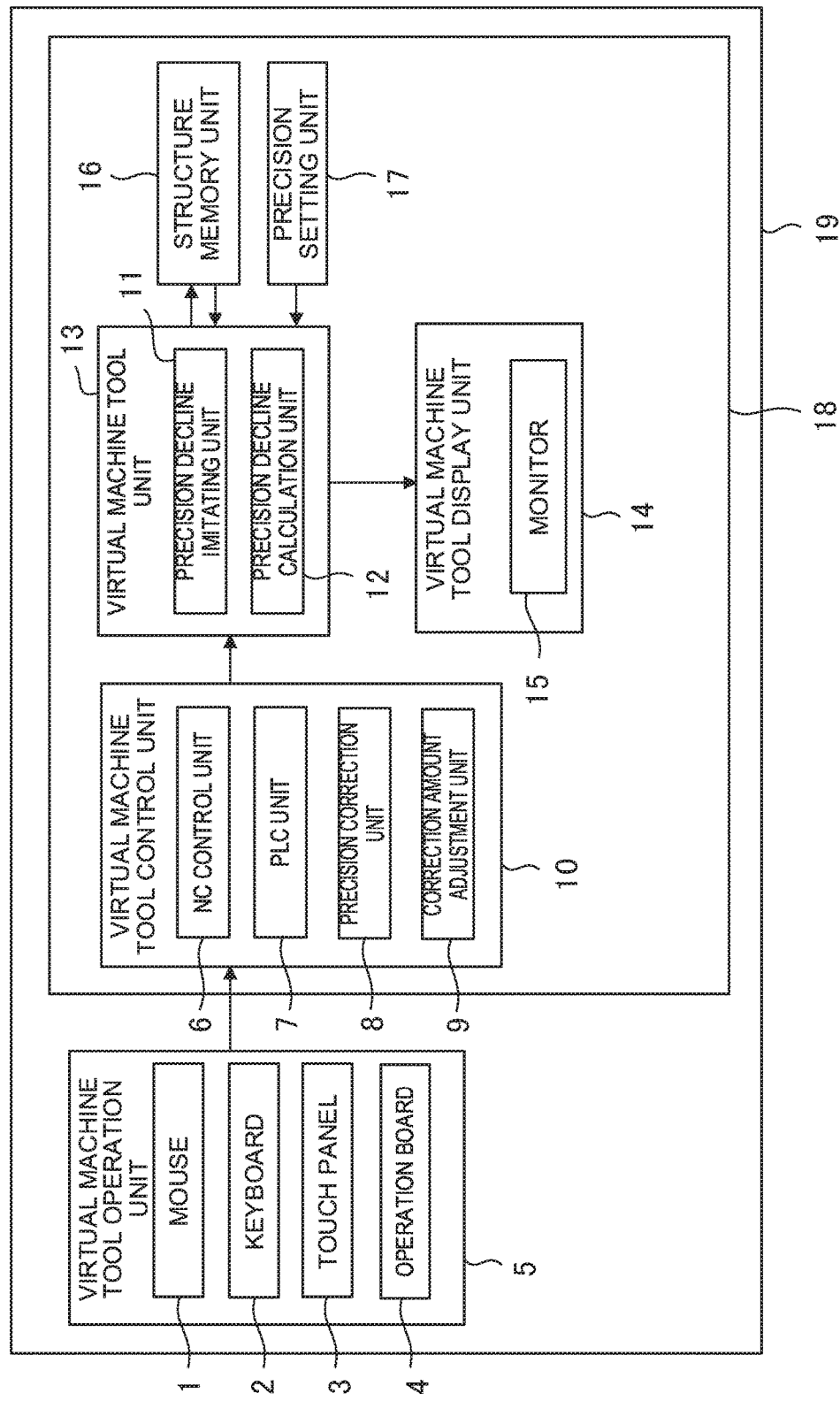
FIG. 1 is a functional block diagram showing the thermal displacement correction training unit according to the present invention.

FIG. 1 is a functional block diagram showing the thermal displacement correction training unit according to the present invention. A thermal displacement correction training unit 19 for the thermal displacement correction without the need for an actual machine tool is prepared. An operator of a machine tool can learn the method for thermal displacement correction and the adjustment method for thermal displacement using the thermal displacement correction training unit 19.

The thermal displacement correction training unit 19 is provided on a computer 18 with a virtual machine tool control unit 10, a virtual machine tool unit 13 and a virtual machine tool display unit 14.

In order to train an operator for a machine tool, the virtual machine tool unit 13 in the thermal displacement correction training unit 19 calculates a virtual model of a machine tool so as to display the calculation results on the monitor 15 of the virtual machine tool display unit 14. The virtual machine tool control unit 10 controls the virtual model in the virtual machine tool unit 13. Here, the computer 18 includes a personal computer in addition to a CNC (computer numerical control unit for controlling the machine tool).

The virtual machine tool unit 13 has: a precision decline imitating unit 11 which applies a certain amount of heat to a certain portion of the machine tool so as to calculate the change in the temperature distribution due to the dissemination of the heat and calculates the amount of thermal displacement in the virtual model as the precision correction amount; and a precision decline calculation unit 12 for finding the process precision decline caused by the application of heat. Here, the portion to which the heat is applied and the amount thereof may be predicted from the operation instructions of the process program so that the above-described amount of heat may be applied to the virtual model in the above-described precision decline imitating unit 11.

The amount of process precision decline that is imitated by the precision decline imitating unit 11 may not necessarily be the same as the amount of precision decline that is caused in an actual machine tool. In some cases, the applied amount of heat is negative, which means cooling.

The virtual machine tool control unit 10 has: a precision correction unit 8 which finds the correction amount through calculation in order to carry out correction in response to the process precision decline due to thermal displacement in the same manner as in an actual machine tool; and a correction amount adjustment unit 9 for manually adjusting the correction amount thereof. In addition, the virtual machine tool control unit 10 is provided with an NC control unit 6 for generating control instructions to be outputted to the virtual machine tool unit 13 and a PLC unit 7 in the same manner as in an actual numerical control unit for controlling an actual machine tool. The virtual machine tool unit 13 drives a virtual model through control instructions from the virtual machine tool control unit 10.

The computer 18 is provided with a structure memory unit 16 for storing data in a state where thermal displacement has not been generated in the virtual model as a reference for the comparison before and after thermal displacement in the case where thermal displacement is generated. Furthermore, the computer 18 is provided with a precision setting unit 17 for setting the allowable difference d between the amount of precision decline and the correction amount.

Next, the procedure of the training for thermal displacement correction is described. In the virtual machine tool unit 13, the precision decline imitating unit 11 applies amounts of heat to one or more portions of the virtual model of a machine tool, respectively, so as to generate thermal displacement in the virtual model. That is to say, a certain amount of heat is applied to a certain portion in the machine tool so as to calculate the change in the temperature distribution due to the dissemination of the heat thereof, and thus, the amount of thermal displacement in the virtual model is calculated so as to imitate the decline in the process precision that is caused by the heat during the operation of the virtual machine tool unit 13.

The precision decline calculation unit 12 finds the precision decline in the processing caused by the application of heat. At this time, the precision decline calculation unit 12 compares the amount of thermal displacement in the virtual model that has been calculated in the precision decline imitating unit 11 to the state of the virtual model before thermal displacement has been caused that is stored in the structure memory unit 16 and stores the difference as the amount of precision decline that represents the amount of displacement in the point at which the work is processed in the virtual machine tool unit 13.

Meanwhile, in the virtual machine tool control unit 10, the precision correction unit 8 is used to correct the processing point in response to thermal displacement (here, the amount by which the correction is carried out is referred to as the correction amount). The above-described correction amount may be a correction amount that has been appropriately set or a correction amount that is calculated in accordance with the same precision correction method as in an actual machine tool. Here, the correction amount found in the precision correction unit 8 is not necessarily the same as the above-described precision decline amount (the precision decline amount stored in the precision decline calculation unit 12).

After the calculation of the correction amount in the precision correction unit 8 of the virtual machine tool control unit 10, the precision decline amount stored in the precision decline calculation unit 12, the above-described correction amount (correction amount calculated in the precision correction unit 8) and the difference between these are displayed on a monitor 15 in the virtual machine tool display unit 14 in the computer 18. It is possible for the trainee who is an operator to determine from the results thereof whether the precision decline has been sufficiently corrected.

In the case where the difference between the above-described precision decline amount and the above-described correction amount is sufficiently small and there is no need to use the correction amount adjustment unit 9 in the virtual machine tool control unit 10, the adjustment is complete. In contrast, in the case where the difference between the above-described precision decline amount and the correction amount is large and it is determined that adjustment is necessary, the trainee who is an operator adjusts the correction amount (see FIG. 2). After the adjustment, the difference between the adjusted correction amount and the above-described precision decline amount may be found, and how the above-described difference has changed before and after the adjustment may be displayed on the monitor screen (see FIG. 3).

Figure 2:
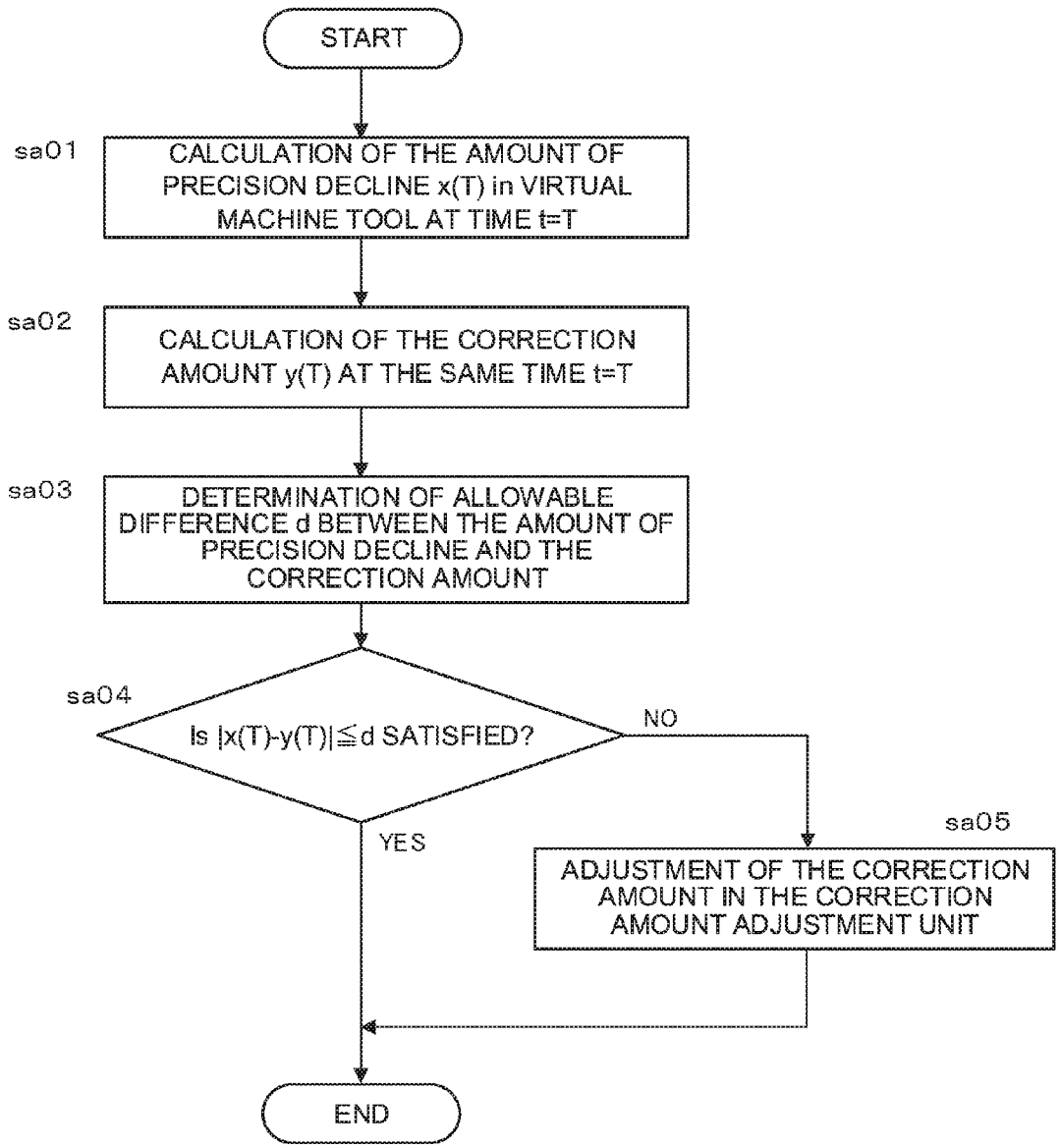
FIG. 2 is a flow chart showing the process for carrying out the adjustment of the amount of thermal displacement correction due to the comparison between the precision decline amount and the correction amount.
Figure 3:
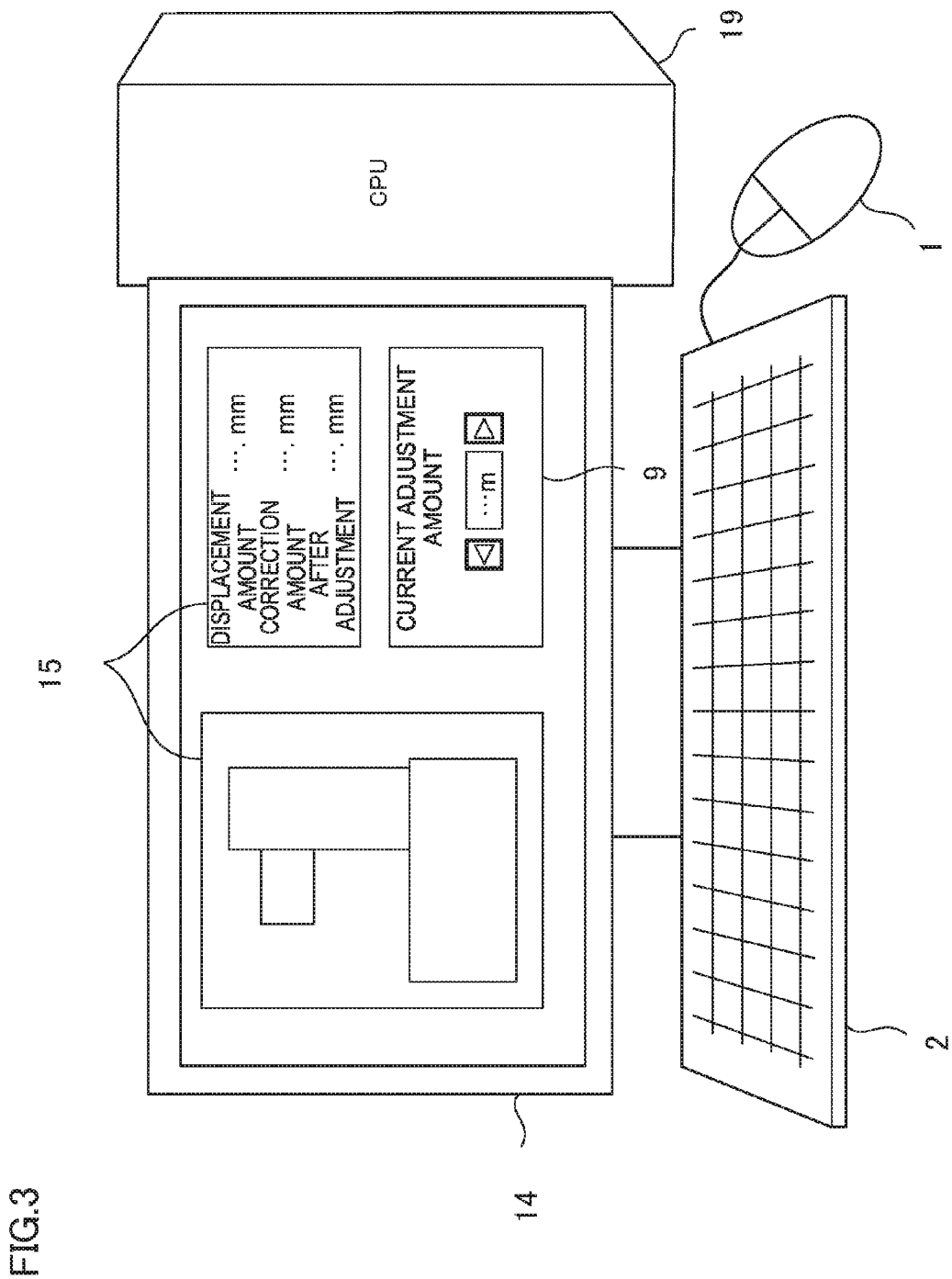
FIG. 3 is a diagram showing the appearance of the thermal displacement correction training unit according to one example of the present invention.

Here, the flow of the procedure for carrying out the adjustment of the amount of thermal displacement correction through the comparison between the amount of precision decline and the correction amount is described in reference to FIG. 2. FIG. 3 is a diagram showing the appearance of the thermal displacement correction training unit according to one example of the present invention.

[Step sa01] The amount of precision decline x(T) in the virtual machine tool at time t=T is calculated (the amount of precision decline is found through the calculation by the precision decline calculation unit 12 in the virtual machine tool unit 13).

[Step sa02] The correction amount y(T) at the same time t=T is calculated (found through calculation by the precision correction unit 8 in the virtual machine tool control unit 10).

[Step sa03] The allowable difference d between the amount of precision decline x(T) and the correction amount y(T) is determined (that is to say, the preset allowable difference d is read in from the precision setting unit 17).

[Step sa04] It is determined whether the absolute value of the difference between the amount of precision decline x(T) and the correction amount y(T) is no greater than the allowable difference d, and the process is complete in that case or moves to step sa05 in the other case.

[Step sa05] The correction amount is adjusted and the process is complete. The correction amount is manually adjusted in the correction amount adjustment unit 9 of the virtual machine tool control unit 10. The manual adjustment can be carried out using at least one means shown as the virtual machine tool operation unit 5 in FIG. 1. It is possible to use the mouse 1, the keyboard 2, the touch panel 3 or the operation board 4 in the actual machine tool.

At the above-described training time, the operation board 4 in the machine tool can be used for the adjustment of the correction amount. The operation board 4 may be a virtual operation board prepared within the computer 18 or may be an operation board in an actual machine tool connected to the computer 18. In addition, it is possible to use the mouse 1, the keyboard 2 or the touch panel 3 as a machine tool operation unit.

At the above-described training time, a virtual model of a machine tool that is displayed on the monitor 15 can be used to display three-dimensional structures in the case of no thermal displacement and in the case where thermal displacement has been caused, respectively, so that the type of displacement caused by heat can be visually confirmed. Furthermore, thermal displacement in a machine tool is generally minute, and therefore, the amount of thermal displacement is multiplied by a certain magnification so that the degree of displacement in the virtual model of the machine tool is made greater than the actual displacement when displayed on the monitor. As a result, in some cases, the thermal displacement in the machine and the thermal displacement in the process coordinates are presented to a trainee so that the trainee can easily understand.

At least either the amount of precision decline (the amount calculated by the precision decline calculation unit 12) or the collection amount (the amount calculated by the precision correction unit 8) may be set in advance in the precision setting unit 17 of the thermal displacement correction training unit 19. As a result, it is possible to save time required for the calculation of the amount of precision decline or the correction amount. The virtual machine tool control unit 10 may be a unit prepared within the computer 18 in addition to a unit separate from the computer 18.

The embodiment according to the present invention has the following effects.

Training for the adjustment of the precision correction unit in response to thermal displacement can be carried out without preparing a machine tool for training.

The trainee can confirm the results of adjustment from the change in the difference between the amount of precision decline and the correction amount before and after the adjustment, and thus, it is possible to learn the method for adjusting the correction.

As a result of the training of the adjustment, errors in the adjustment for the thermal displacement correction can be reduced.

The adjustment on the operation board of the machine tool makes it possible to carry out the training for adjusting the correction in a state that is close to the use of an actual machine tool.

The degree of deformation in the machine tool due to thermal displacement is made greater when displayed on the monitor, and thus, it is possible for the trainee to easily understand the effects of thermal displacement and correction.

The amount of precision decline and the correction amount that have been set in advance are used so that the training for adjusting the correction can be easily carried out without setting a process program or the applied amount of heat.

Though an embodiment of the present invention is described above, the present invention is not limited to the above-described embodiment and can be implemented in other embodiments to which an appropriate modification has been applied.

The invention claimed is:

1. A thermal displacement correction training unit having on a computer a virtual machine tool unit, a virtual machine tool control unit for virtually controlling said virtual machine tool unit, a virtual machine tool operating unit for operating said virtual machine tool unit and said virtual machine tool control unit, and a virtual machine tool display unit, characterized in that said virtual machine tool unit has:
  a precision decline imitating unit for imitating the process precision decline caused by the heat during operation of said virtual machine tool unit; and
  a precision decline calculating unit for finding the amount of precision decline that represents the process precision decline in said virtual machine tool unit that is imitated in said precision decline imitating unit, said virtual machine tool control unit has:
a precision correction unit for finding the correction amount by which the processing point is corrected in response to thermal displacement; and
a correction amount adjustment unit for adjusting the correction amount that is found by said precision correction unit, and
said virtual machine tool display unit displays the amount of precision decline found by said precision decline calculating unit in said virtual machine tool unit and the correction amount adjusted by said correction amount adjustment unit in said virtual machine tool control unit.

2. The thermal displacement correction training unit according to claim 1, characterized in that said virtual machine tool display unit displays at least either the change in the processing point in said virtual machine tool unit found in said precision decline imitating unit or the change in the processing point found in said precision correction unit.

3. The thermal displacement correction training unit according to claim 1, characterized in that at least either the amount of precision decline found by said precision decline calculation unit or the precision correction amount for said precision correction unit has been set in advance.

4. The thermal displacement correction training unit according to claim 1, characterized in that said virtual machine tool display unit displays said virtual machine tool unit.

* * * * *